UNITED STATES PATENT OFFICE.

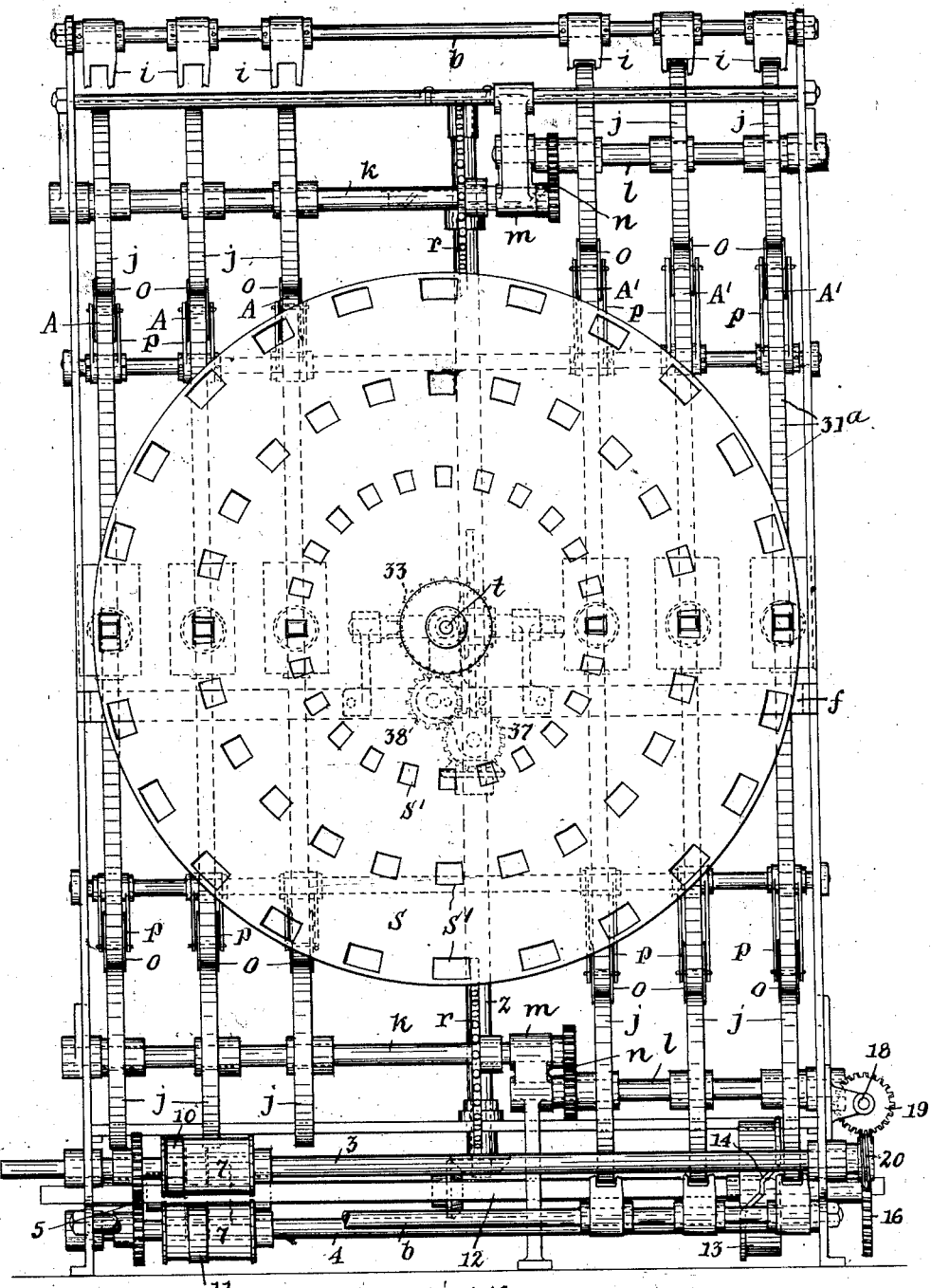

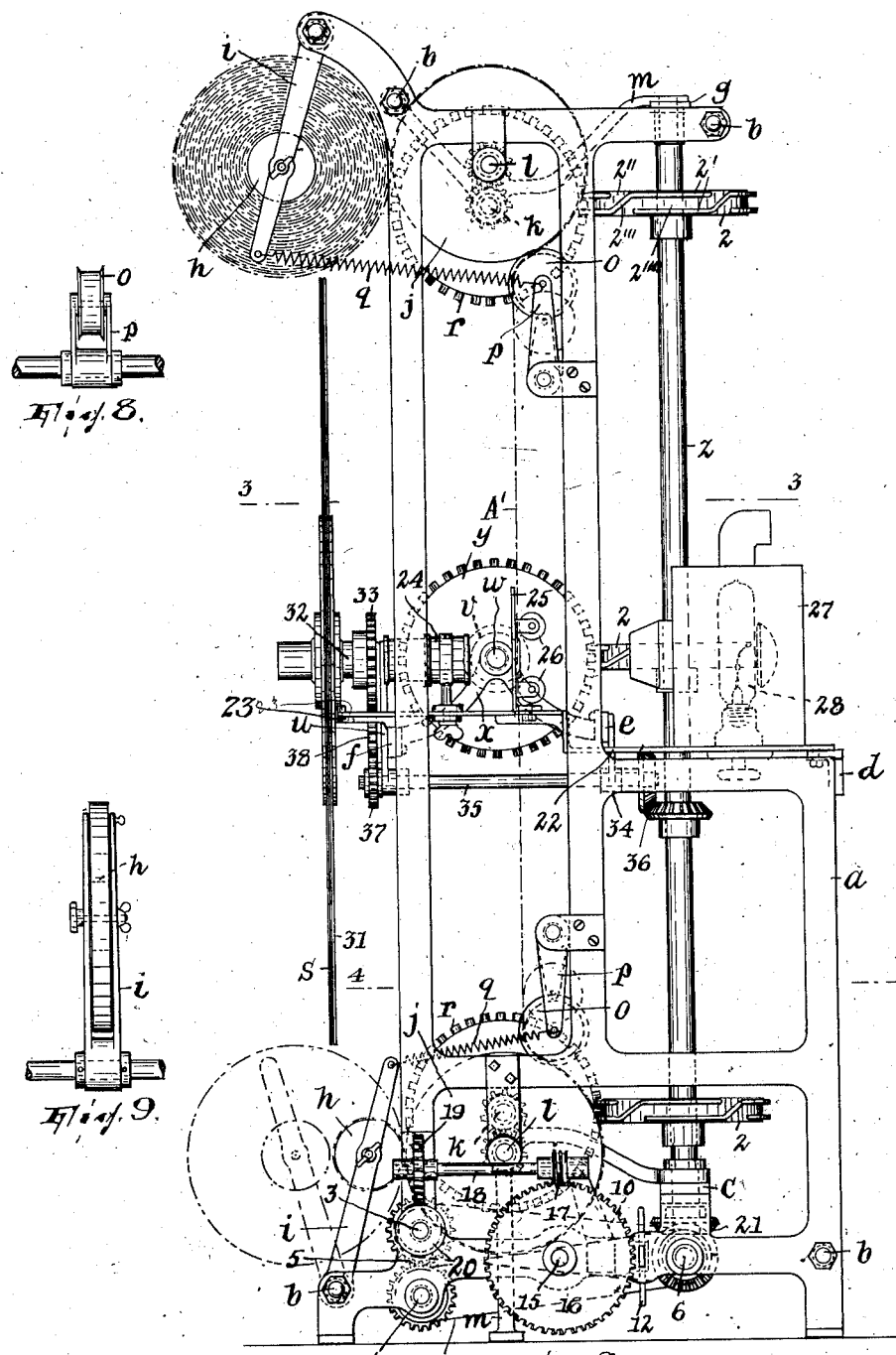

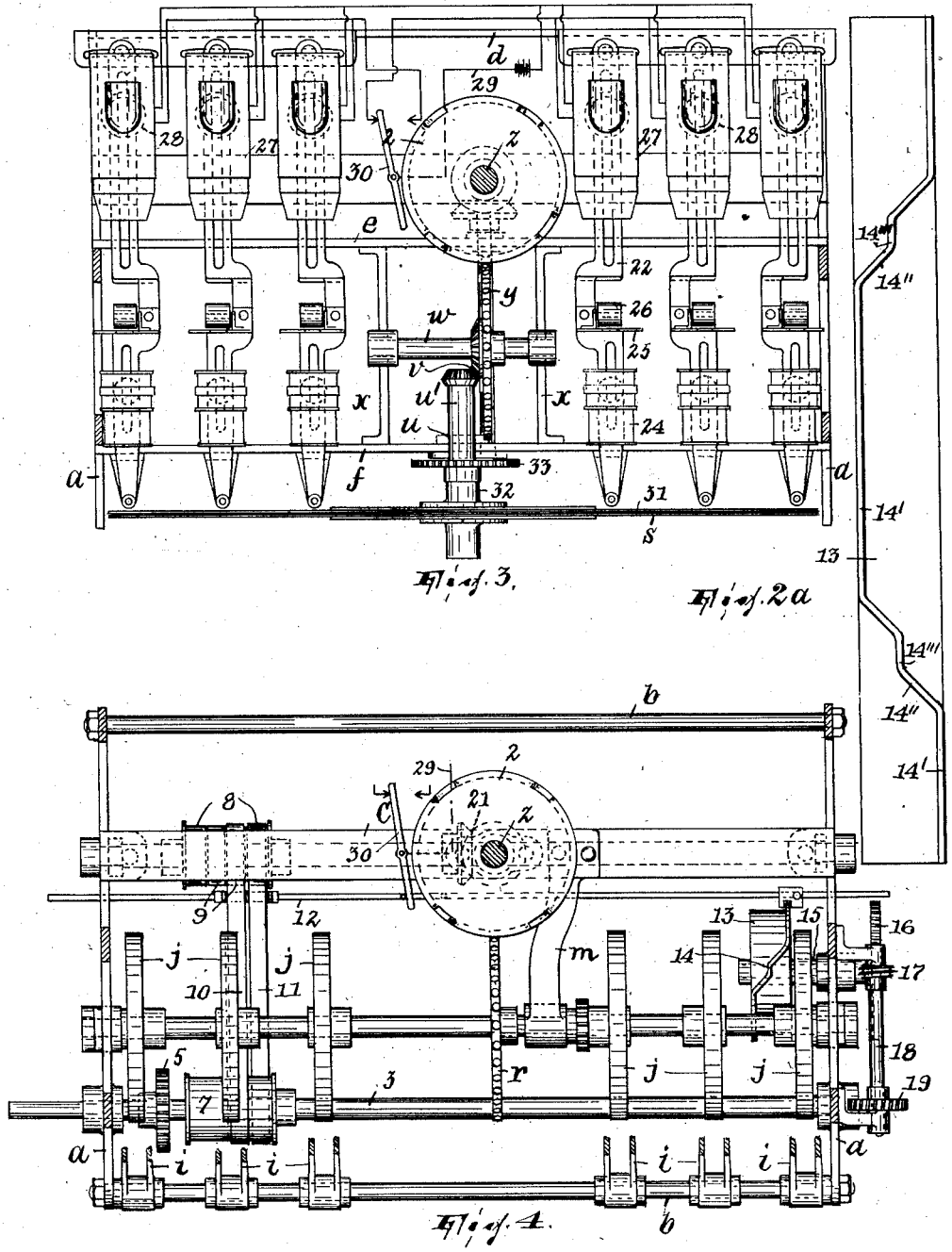

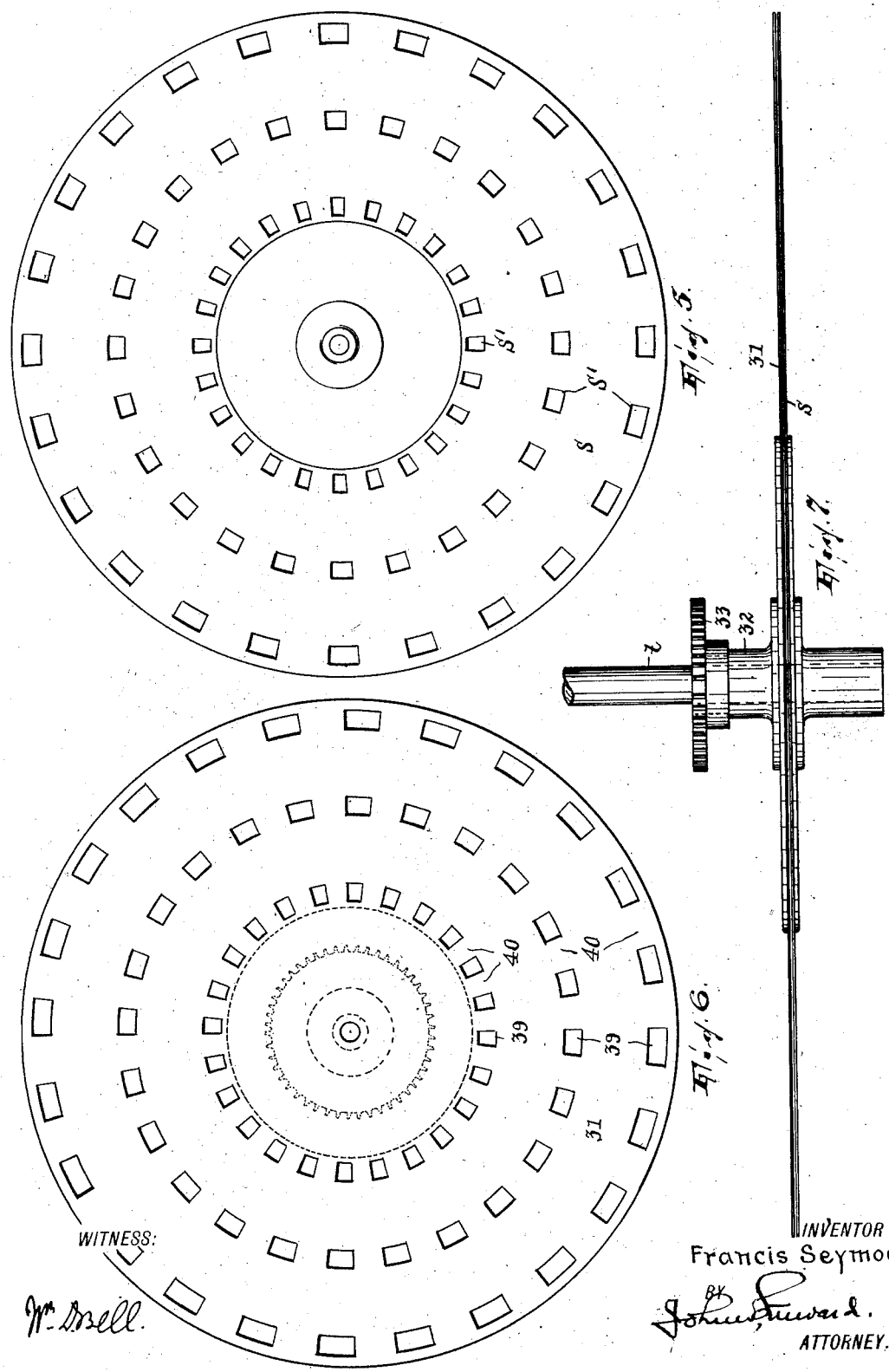

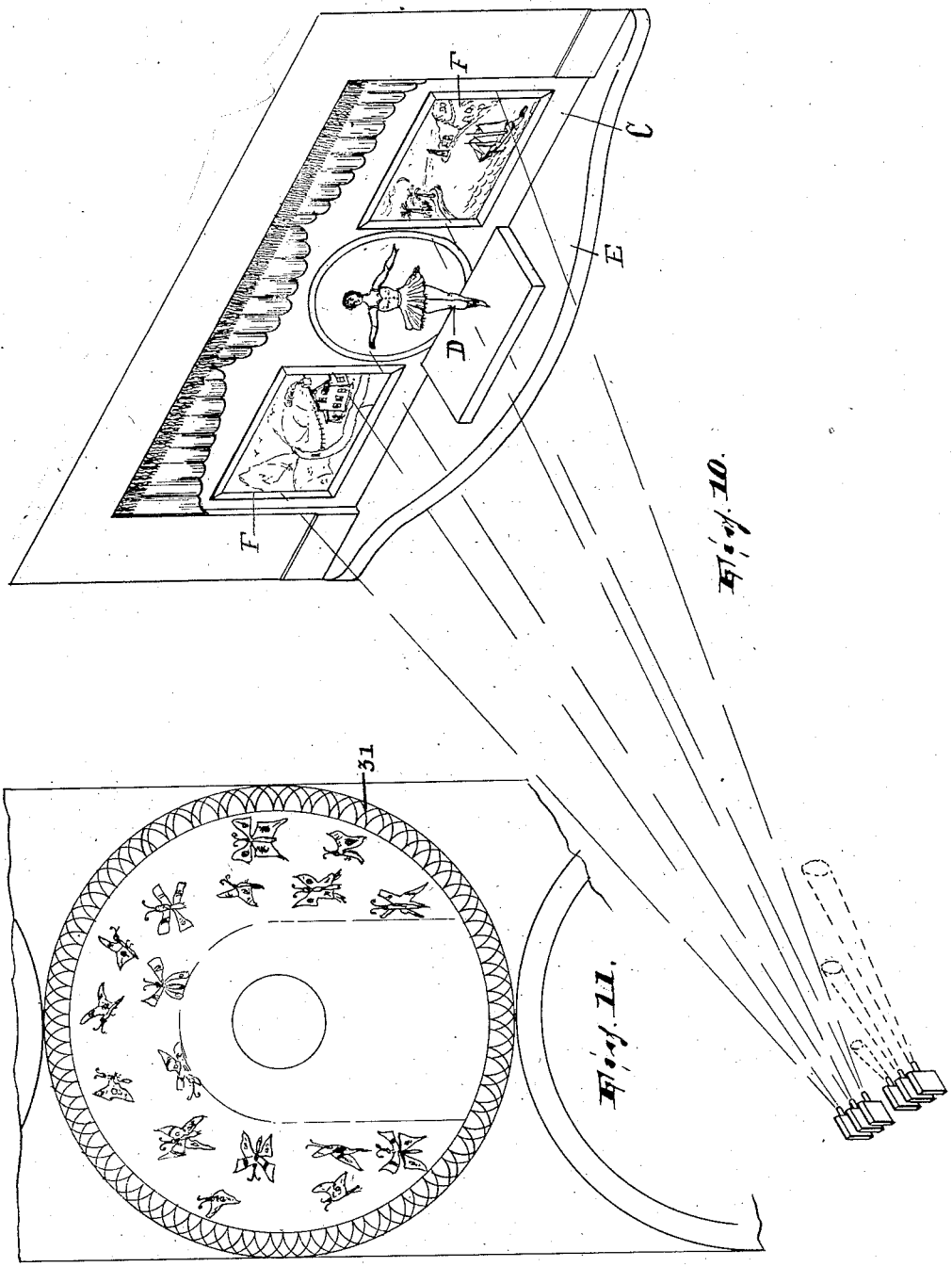

FRANCIS SEYMOUR, OF PATERSON, NEW JERSEY.

MOTION-PICTURE MACHINE.

1,317,043.　　　　　Specification of Letters Patent.　　Patented Sept. 23, 1919.

Application filed November 13, 1918. Serial No. 262,289.

*To all whom it may concern:*

Be it known that I, FRANCIS SEYMOUR, a citizen of the United States, residing at Paterson, in the county of Passaic and State of New Jersey, have invented certain new and useful Improvements in Motion-Picture Machines, of which the following is a specification.

This invention relates to moving picture machines and it consists in certain improvements having especially to do with the projecting of moving pictures. One part of my invention contemplates the combination, with two picture films (or two sets of two or more picture films), of time-to-time-reversing driving means to advance the films (or sets of films) one forward and the other backward; by this, with the driving means constantly going, there may be effected a substantially uninterrupted "delivery" of pictures, for always while one film is "delivering" the other film is being reset (rewound), the reverse taking place when the delivering film becomes exhausted. My invention, as to this part thereof, also contemplates in the best form a shutter means and an illuminating means to coöperate with the delivery film in the illusion of so-called moving pictures. Another part of my invention consists in novel means to prevent "flicker" in a moving picture projecting machine. I now proceed to describe that embodiment of my invention which is shown in detail in the accompanying drawings, finally pointing out the salient novel features in the claims which are appended to this specification.

Figure 1 in said drawings is a front elevation of the machine;

Fig. 2 a side elevation;

Fig. 2ª shows a certain cam 13 developed in a plane;

Figs. 3 and 4 are horizontal sectional views on lines 3—3, 4—4, Fig. 2;

Figs. 5 and 6 are front elevations of the shutter and light-cutter;

Fig. 7 is a plan of the shutter and light-cutter;

Figs. 8 and 9 are elevations of one of the feed-rollers and one of the guide-rollers;

Fig. 10 is a perspective illustrating one adaptation of my machine; and

Fig. 11 illustrates a fragment of one of the films.

The frame of the machine includes two side-standards $a$, and tie-bars $b$ and tie-strips $c$, $d$, $e$, $f$, $g$ connecting them.

Viewing the machine from the front there are (in the present adaptation) three sets of vertically moving films at each side of the center. These films, designated A, A, A and A′, A′, A′, are each capable of being wound back and forth from one to the other of two rollers $h$ placed one near the top and the other near the bottom of the machine and each journaled in a fork $i$ fulcrumed in the frame on a horizontal axis. Immediately back of each such roller is a feed-roller $j$, the group of three such upper rollers and the group of three such lower rollers at one side of the machine being fixed on the shafts $l$ and the two corresponding upper and lower groups of such rollers at the other side of the machine being fixed on the shafts $k$. Each two shafts $k$ and $l$ are horizontal and are journaled at their outer ends in the respective side-standards and at their inner ends in a suitable bracket $m$ (placed somewhat to one side of the center of the machine), being connected at their inner ends by gearing $n$ so that they rotate relatively reversely to each other. Back of each feeder-roller is a guide-roller $o$ having a grooved periphery receiving the periphery of the corresponding feed-roller, and this roller is journaled in a fork $p$ fulcrumed in the frame. A spring $q$ connects the two corresponding forks $i$ and $p$, thus holding both rollers $h$ and $o$ pressing against the feed-rollers. Each film extends from one roller $h$, around the adjoining feed-roller and between the same and corresponding guide-roller, and then between the other guide-roller and feed-roller, around the latter to the other roller $h$; at the outset it is established in a state of tension, which is maintained at all times while the machine is operating because of the friction-grip maintained by the rollers $h$, $j$, $o$ and because the two upper shafts $k$ and $l$ are geared to the two lower ones as will appear.

On each shaft $k$ is a pin-wheel $r$.

The shutter $s$ is a disk having a series of exposure apertures $s'$ in different equidistant radii thereof; in fact, in the present instance, since there are three films delivering at a time (as will appear), this shutter has three concentric series of such apertures, such series being spaced apart the same as are the films. It is fixed on the forward end of a horizontal shaft $t$ journaled in a sleeve $u'$ at the upper end of a bracket $u$ fixed to the tie-strip $f$, and at its rear end this shaft is connected by bevel-gearing $v$ with a transverse shaft $w$ (journaled in stands $x$ mounted on the tie-strips $e$ $f$) on which is a pin-wheel $y$ having the same number of teeth or peripheral pins as the pin-wheels $r$.

In the tie-strips $c$ and $q$ is journaled a vertical shaft $z$ which carries three cams 2 peripherally engaged with the pin-wheels $r$, $y$, $r$.

Each cam is divided into equal peripheral and similar cam portions each of which includes a pair of parallel spaced ribs $2'$ extending longitudinally of the periphery of the cam, such pairs being separated by a break $2''$ excepting as to an oblique rib $2'''$ which connects one end of the lower rib of one pair with the adjoining end of the upper rib of the next succeeding pair, the effect of which is to form the periphery of the cam with a succession of camways $2''''$ which at their ends are diverted respectively up and down but between their ends extend longitudinally of the periphery of the cam, so that assuming one of the pin-wheels to be engaged with such a cam as shown in the drawings and the cam to be rotated in either direction the pin-wheel will be alternately rotated and held at dwell. It is desirable that as to the shutter's movement it should have a slight lead and follow with respect to the films so as to insure as perfect "cover" as possible while the film is moving. Hence, while the cam for the shutter has in the present instance the same diameter as the other two cams, I prefer to decrease the length of its ribs $2'$ and correspondingly increase the length of its ribs $2'''$, which of course also involves less degree of obliqueness of the latter. In the present case there are four cam portions to each cam, and the cams are so arranged that as to every one of four radial planes 90° apart such plane will be coincident with a plane exactly midway of the length of the two ribs $2'$ of each of the three cams; wherefore it will be seen that when the shaft $z$ is in rotation the films and shutter will respectively advance and rotate step by step, both being at dwell at the same time and in rotation at the same time, though, as explained, the shutter has a slight lead and follow for each of its movements with respect to the films.

The shaft $z$ is adapted to be rotated first in one direction and then in the other, in view of which it will be apparent that (with both sets of films arranged to "read" the same way—either up or down) as one moves one way to "deliver" the other becomes reset (rewound), this condition being relatively reversed as to the two sets whenever the direction of rotation of said shaft is reversed. Of course (in the present adaptation) the shutter also rotates one way or the other according to the direction of rotation of shaft $z$, coöperating first with one set of films and then with the other as each delivers; as will be pointed out its action with respect to the set of films which is being reset at any time is negative, since the light appertaining to that set of films is then inactive.

The time-to-time reversing driving means for shaft $z$ is as follows: 3, 4 designate a pair of transverse horizontal shafts one of which may be extended at one end to receive a pulley or other driving member, said shafts being connected by gearing 5 so as to rotate relatively reversely. Back of these shafts is another transverse horizontal shaft 6. Shafts 3, 4 each have an elongated pulley 7, and shaft 6 two fast pulleys 8 and, between them, two loose pulleys 9; two belts 10 and 11 extend around the pulleys 7 of the respective shafts 3, 4 and also around the set of pulleys 8, 9. 12 is a shifter, movable back and forth transversely of the machine, in the side standards, being engaged with both belts. The shifter (as will appear) is movable to each of three positions; at each limit of its motion it establishes the belts on one fast and one loose pulley 8, 9 and at the intermediate position it establishes the belts on both loose pulleys. A cam 13 controls the shifter, having a peripheral rib 14 engaged in a notch in the shifter (Fig. 4); the rib has two longitudinal portions $14'$ of equal length joined by two oblique portions $14''$ of equal pitch (but reverse to each other), each oblique portion having a short longitudinal portion or dwell $14'''$ half-way of its length. The cam 13 is mounted on a suitably journaled shaft 15 carrying a worm-wheel 16 in mesh with a worm 17 on a suitably supported shaft 18 carrying a worm-wheel 19 in mesh with a worm 20 on the shaft 3. Every half-revolution of the cam, which derives its motion from shaft 3, one of the oblique portions of its rib 14 moves the shifter one way or the other and so shifts the belts. It is desirable that the reversing should be effected with a dwell intervening between the rotations of shaft 6 in opposite directions; wherefore the object of two loose pulleys 9 and the dwell portion $14'''$ in the rib of cam 13 will be apparent. Shaft 6 is connected with shaft $z$ by the bevel gearing 21.

There are a lamp-house, lens and film-guide for each film, all mounted on a single support. This support 22 is pivoted on a vertical axis near the shutter to an arm 23 of strip $f$ and it rests at its rear end on the strip $d$. The lens 24 is adjustable to and from the shutter in the support. Back of the lens, on said support, is the film-guide consisting of an apertured plate 25 between which and spaced superposed guide rollers 26 journaled therein the film extends. Back of the film-guide is the forwardly and backwardly adjustable lamp-house 27, the light aperture of which is alined with the lens and the aperture in plate 25. The two (right and left) sets of electric lamps 28 of these lamp-houses are in different branches of the light circuit 29, which may contain a switch 30 movable with the belt-shifter 12 whereby each set of lamps will be alternately cut in and cut out when the corresponding films are delivering and resetting, respectively (Fig. 3).

The operation of the machine as so far described is as follows: Shaft 3 being continuously rotated in one direction and rotating shaft 4 in the opposite direction, and also through the means 20, 19, 18, 17, 16, 15 and 14 reciprocating the belt shifter 12, the belts 10, 11 will be from time to time shifted so that the power transmitted by them will cause the rotation of shaft 6 and consequently shaft $z$ to be first in one direction and then in the other, with a slight dwell intervening as, in the shifting, the two belts are established on the idle pulleys and rib-portions $14'''$ of cam 13 engages the notch of the shifter 12. While one set of film feeding means is proceeding in one direction, delivering pictures, the other set is proceeding in the opposite direction, rewinding the films; at the same time the shutter is rotated first one way and then the other (the reversals thereof occurring coincidently with the reversals of the films), in the present adaptation always so that its direction of rotation is the same as the films which are delivering. The movements of the films and shutter are always step-by-step (the same as in my application Serial No. 260,993, in which this feature of my invention has already been set forth), the shutter coming to a stop with an aperture $s'$ thereof opposite one of the picture areas (designated $31^a$ in Fig. 1) each time the film stops but covering the film, by its portion between two adjoining apertures, while the film performs each increment of advance, as already sufficiently explained. In the preferred form as herein illustrated the two sets of lamp-houses are alternately made one active and the other inactive (under control of switch 30) to illumine the films; that is, when either set of films is delivering, light is being projected on and through the same by the corresponding lamp-houses, but at that time the lights in the lamp-houses for the other (rewinding) set of films are extinguished. Thus, so long as shaft 3 is driven, the machine projects pictures progressively, first by the films at one side and then by those at the other. The lamp-houses may be shifted so as to project the light beams where desired. Thus in Fig. 10, the beams of three lamp houses of one set are arranged to project to the same places on a screen C as those of the other set. This view shows the middle lamp house projecting its beam onto a person D acting on a stage E forward of the screen while moving pictures F are projected by the other two lamp houses, and the corresponding films onto the screen. If desired, the film appertaining to the middle lamp house in each set may be developed with fanciful pictures, changing colors, etc., as shown by Fig. 11, the center of the picture area being left bare to form a spot light for the actor's face.

The ordinary moving picture projecting machine has a continuously rotating shutter, and in the endeavor to prevent so-called "flicker" the shutter is formed with one or more apertures in addition to the main or exposure aperture, the additional aperture or apertures serving to modulate the contrast between alternate light and darkness otherwise produced by the shutter by allowing the light beam to pass through the shutter one or more times between each two succeeding exposures. According to my invention, where the shutter moves step by step in synchrony with the film, placing an exposure aperture in fixity before each picture area brought to a standstill in the light-beam, flicker is prevented by repeatedly cutting off the light-beam for each pause of shutter and film, this being preferably accomplished by an element, such as a disk, which is provided with alternate openings and obscuring portions and is moved through the light-beam at a high speed. Thus, back of the shutter $s$ is a disk or "light-cutter" 31 carried by a sleeve 32 which is journaled on shaft $t$ and has a pinion 33. In the bracket $u$ and a bracket 34 is journaled a horizontal shaft 35 connected by bevel gearing 36 to the shaft $z$ and at its forward end carrying a pinion 37 which meshes with a pinion 38 journaled in bracket $u$ and meshing with pinion 33. Since shaft $z$ rotates continuously, the light-cutter 31 will rotate continuously while the shutter $s$ is moving step by step, and consequently during each pause of the shutter a circular series of alternating apertures 39 and obscuring portions 40 in the light-cutter will pass through the light-beam (there being in the present case three of these series, registering with the three concentric series of exposure apertures in the shutter). As to this part of my invention it will be understood that I am not confined to an intermittently rotating shutter, the broad idea I wish to reserve being means to interrupt the light beam intermittently during each placement of a picture area and the projecting of the picture thereof by a light beam, so that flicker, instead of being prevented by lighting up (as it were) the screen on which the pictures are projected by means of projections of light intervening between those respectively occurring in synchrony with picture placements is prevented by a darkening (as it were) of the screen by intermittent eclipsing or obscuration of the light active during each picture placement.

Having thus fully described my invention, what I claim as new and desire to secure by Letters Patent is:—

1. The combination, with a case and two picture films therein, the latter having separate apertures, one for each film, of means coöperating to display the films alternately, one being time-to-time-reversing driving means to advance the films one forward and the other backward simultaneously and step by step past the corresponding aperture and the other being means common to both apertures and movable to cover and expose first one and then the other film during its forward increments of advance and intervening pauses, respectively.

2. The combination, with a case and two picture films therein, the latter having separate apertures, one for each film, of means coöperating to display the films alternately, one being time-to-time-reversing driving means to advance the films in relatively opposite directions simultaneously and step by step past the corresponding aperture, the pictures of both films being adapted to be read in relatively the same direction, and the other means being common to both apertures and movable to cover and expose first one and then the other film during its forward increments of advance and intervening pauses, respectively.

3. The combination, with a case and two picture films therein, the latter having separate apertures, one for each film, of means coöperating to display the films alternately, one being time-to-time-reversing driving means to advance the films one forward and the other backward simultaneously and step by step past the corresponding aperture and the other being a rotary shutter common to both apertures and movable to cover and expose first one and then the other film during its forward increments of advance and intervening pauses, respectively.

4. The combination of a rotary shutter having an exposure aperture eccentric of its axis, two picture films arranged in different chords of but equidistant from the center of the circle described by the rotating aperture, and means, gearing the shutter and films together, to rotate the shutter and advance either of the films step by step in synchrony.

5. In combination, an intermittently movable series of successive pictures, means to project a beam of light on the pictures, an intermittently movable shutter movable through the light beam and having means to allow the light beam to pass therethrough on each dwell thereof, means to intermittently intercept the light beam while each picture is in placement, and means to cause alternate movements together and dwells together of said series and shutter and at the same time drive the second-named means.

6. In combination, an intermittently movable series of successive pictures, means to project a beam of light on the pictures, an intermittently movable shutter movable through the light beam and having means to allow the light beam to pass therethrough on each dwell thereof, means to intermittently intercept the light beam while each picture is in placement including a rotary shutter, and means to cause alternate movements together and dwells together of said series and the first-named shutter and at the same time rotate the rotary shutter.

In testimony whereof I affix my signature.

FRANCIS SEYMOUR.